(12) United States Patent
Bolsee

(10) Patent No.: US 6,958,999 B1
(45) Date of Patent: Oct. 25, 2005

(54) FRAME BUNDLING AND PAYLOAD SWITCHING

(75) Inventor: Benoit Bolsee, Brussels (BE)

(73) Assignee: World Telecom Labs N.V., Zaventen (BE)

(*) Notice: Subject to any disclaimer, the term of this patent is extended or adjusted under 35 U.S.C. 154(b) by 0 days.

(21) Appl. No.: 09/372,129

(22) Filed: Aug. 11, 1999

(51) Int. Cl.[7] .......................... H04L 12/28; H04L 12/56
(52) U.S. Cl. ............... 370/395.52; 370/230; 370/230.1; 370/231; 370/352; 370/395.51; 725/109; 725/118; 725/119; 348/461
(58) Field of Search ................................ 370/351–357, 370/360, 395.1, 395.51, 395.52, 401, 537, 335, 468, 392, 465–466, 470–474, 477, 521, 229, 230, 230.1, 231, 235, 389, 400; 725/109–111, 118–119, 131–132; 348/461, 552

(56) References Cited

U.S. PATENT DOCUMENTS

| | | | | |
|---|---|---|---|---|
| 4,665,514 A | * | 5/1987 | Ching et al. | 370/392 |
| 6,236,653 B1 | * | 5/2001 | Dalton et al. | 370/352 |
| 6,278,708 B1 | * | 8/2001 | Von Hammerstein et al. | 370/471 |
| 6,389,038 B1 | * | 5/2002 | Goldberg et al. | 370/471 |
| 6,408,001 B1 | * | 6/2002 | Chuah et al. | 370/392 |
| 6,512,764 B1 | * | 1/2003 | Carew et al. | 370/356 |

OTHER PUBLICATIONS

B. Bolsee, "Voice over Internet Protocol technology," International Telecommunications Update, Call Centers & CTI Technology, 1999/2000.

* cited by examiner

Primary Examiner—Wellington Chin
Assistant Examiner—Raj Jain
(74) Attorney, Agent, or Firm—James Creighton Wray; Meera P. Narasimhan

(57) ABSTRACT

A method and apparatus by which digitized large frames of packets are sent between computer-based switches over a data network and central switch with greater efficiency than with existing digitized voice switching technology. Frame bundling combines the voice packets coming from different terminals into longer frames so that the number of frames and the overhead is reduced on the data network. Frame bundling may be done only with terminals that are connected to the same destination switch. The efficiency of this invention depends on the number of switches in the network and the amount of traffic between pair of switches. Payload switching then sets up one or more central nodes that are connected to several other switches. The central node disassembles the large frames into the packets and reassembles the packets into large combined frames. The disassembled and reassembled frames are sent to the destination switches from the central node.

11 Claims, 1 Drawing Sheet

FRAME BUNDLING AND PAYLOAD SWITCHING

BACKGROUND OF THE INVENTION

Internet Protocol (IP) networks waste nearly 50% of the available bandwidth for IP header transmissions.

A need exists for sending digitized voice over data network with greater efficiency.

SUMMARY OF THE INVENTION

The present invention is a method and apparatus by which a digitized voice is sent between computer-based switches over a data network with greater efficiency than with existing digitized voice switching technology. The invention is especially useful for IP networks, which waste nearly 50% of the available bandwidth for IP header transmission. With the present invention, the "wasted" bandwidth for IP header transmissions may be as low as 5%.

The computer-based switch ("the switch") acts as a protocol converter/adapter for the various terminals connected to it directly or indirectly. Uncompressed calls received from the PSTN (Public Switched Telephone Network) or directly from a PABX (Private Automatic Branch exchange) are compressed using standard compression technology, for example the G.723.1 algorithm on a DSP board. The resulting voice packets and call control information are packaged into an internal format that copes with various voice quality and PSTN/ISDN (Integrated Services Digital Network) Protocols. Compressed calls received from multi-media PC's over LAN (Local Area Network) or Internet lines are converted into the internal format by technology that does not utilize decompression.

One aspect of the invention, "frame bundling", combines the voice packets coming from the different terminals into longer frames so that the number of frames and therefore the overhead is reduced on the data network. Frame bundling may be done only with the terminals that are connected to the same destination switch. The efficiency of this invention depends on the number of switches in the network and the amount of traffic between any pair of switches.

Another aspect of the invention, "payload switching", sets up one or more central nodes that are connected to several other switches. The central node is able to disassemble and reassemble combined frames and may be considered as a voice packet switch. The disassembled and then reassembled frames are sent back to the switches from the central node.

The internal format comprises a special packaging for the voice packets which are generated by the terminals and a communication channel between the switches to exchange call control information. The call control messages are sent directly as IP frames between the switches to let them establish IP calls and set-up the runtime switching tables; this technology is the object of another invention but will be described here to clarify the present invention.

The call control messages are generated by the switch based on the information received from the terminal which is originating a call. This information includes at least the dialed telephone number but can also include a variety of call parameters such as the calling number, the redirecting number, the original called number, the type of call, the forward call indicators, . . . . The ISDN and SS7 standards define a large number of parameters which are transported to the destination party across the PSTN network. The switch will do the same but with IP frames.

Based on the received information, the switch determines the destination switch to which the call should be sent. To better explain the "payload switching" function of this invention, I will assume that the destination switch selected is a central node. Let's call the IP address on the switch IP1 and the IP address of the central node IP2. The switch assigns to the call a temporary internal channel number which is equivalent to a timeslot number on a TDM (Time Division Multiplexing) network, let's call it C1. The channel number C1 and all other relevant information of the call is packaged and assembled in one IP frame and sent to IP2 on a UDP port number reserved for call control messages. The central node will retrieve the message and also assign an internal channel number C2 to that call which can be different than C1. The channel number C2 will be sent back to IP1 with an acknowledgement frame which tells the switch that the call has been accepted by the central node. The central node then retrieves the call information (dialed number, . . . ) and determines the next switch to which the call must be sent. Again, another channel number C3, different than C2, is assigned to this second call and another message containing the channel number and all the call information is sent to IP3, the destination switch IP address. The destination switch will also assign a channel number C4 and acknowledge the call back to IP2.

After the call is established, voice packets flow will start between the switches. Each switch involved in a call appends to each voice packet a small 4 bytes header which contains the channel number assigned by its peer so that each switch receives voice packets on channel numbers assigned by itself, hence all different. In this example, the switch uses C2 and the central node uses C1 for voice packets exchanged between them and the central node uses C4 and the destination switch uses C3 for packets exchanged between them. The central node sets-up a switching table which assigns the channel C2 to C4 and IP3 and C3 to C1 and IP1. C2 and C3 are assigned by the central node and are e guaranteed to be different. This table is equivalent to a TDM switching matrix which is usually implemented in the silicon by traditional TDM switches.

When the central node receives a voice packet with a channel number C2, it looks the switching table and performs the payload switching function: the channel number in the 4 bytes header is set to C4 and the voice packet is put on the queue to IP3. The frame bundling function will assemble all packets to IP3 coming from IP1 and other switches and send the IP frame on the network. Similarly, when a voice packet is received with a channel number C3, it is changed to C1 and put on the IP1 queue.

The call control function will include many more messages than just the call establishment message: the overlap sending, call proceeding, progress, ringing, connect, release message, and more if needed. These messages don't affect the switching function: they are simply propagated backward or forward along the switches involved in a call. This mechanism is a strict emulation of a telephony network.

Without payload switching, frame bundling would be difficult and there would be less reduction of overhead. With payload switching, switches are always sending their voice packets to the central node, which builds the frames according to the runtime switching tables.

When voice packets are combined in large frames, a small 4-byte header is added to the voice data. The 4-byte header contains the type of packet (voice, fax, silence, modem, dtmf, etc.), the length (variable packet sizes are supported) and the destination channel (for payload switching). The 4-byte header replaces the 40-byte IP header that is appended to every voice packet in the cases where there is no frame bundling.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
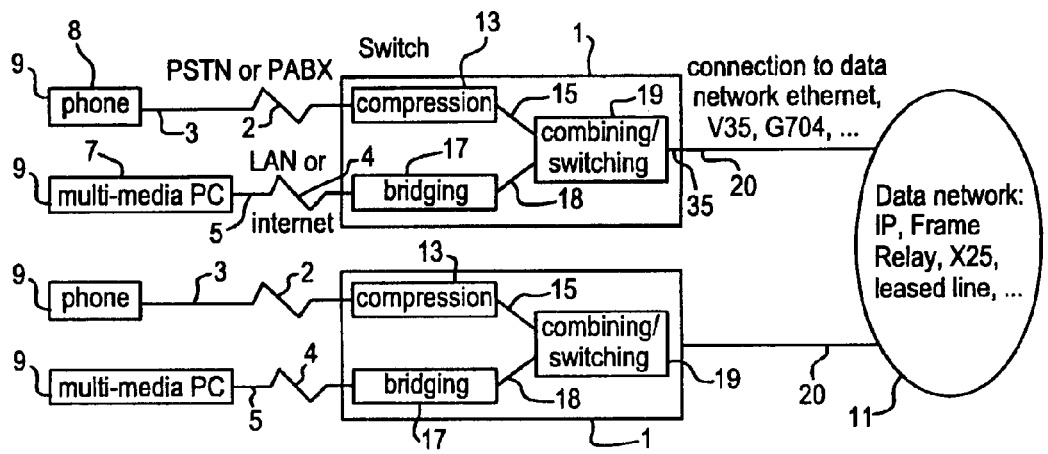
FIG. 1 is a schematic diagram of the switches and the bundling into frames of voice packets from different terminals.

The computer-based switch 1, shown in FIG. 1, acts as a protocol converter/adapter for the various terminals 9, such as multimedia PC's 7 or telephones 8, connected to the switch 1 either directly or indirectly. Indirect connections include a PSTN or PABX 2 or a local area network, LAN, or web connection 4. Uncompressed calls 3 received from the PSTN (Public Switched Telephone Network) or directly from a PABX (Private Automatic Branch exchange) 2 are compressed in switch 1 using a standard compression module 13, for example the G.723.1 algorithm on a digital signal processor (DSP) board. The resulting voice packets and call control information 15 are packaged into an internal format that copes with various voice quality and PSTN/ISDN (Integrated Services Digital Network) Protocols.

Compressed calls 5 received from multi-media PC's 7 over LAN (Local Area Network) or Internet lines 4 are converted and packaged with address information into the internal format 18 by bridging modules 17 without decompression.

One aspect of the invention, frame bundling, combines in combining and switching modules 19 the voice packets 15 and 18 coming from the different terminals 9 into longer frames so that the number of frames and therefore the overhead is reduced on the data network 11. Combining/switching module 19 combines the internally formatted voice packets 15 and 18 into longer frames.

Figure 2:
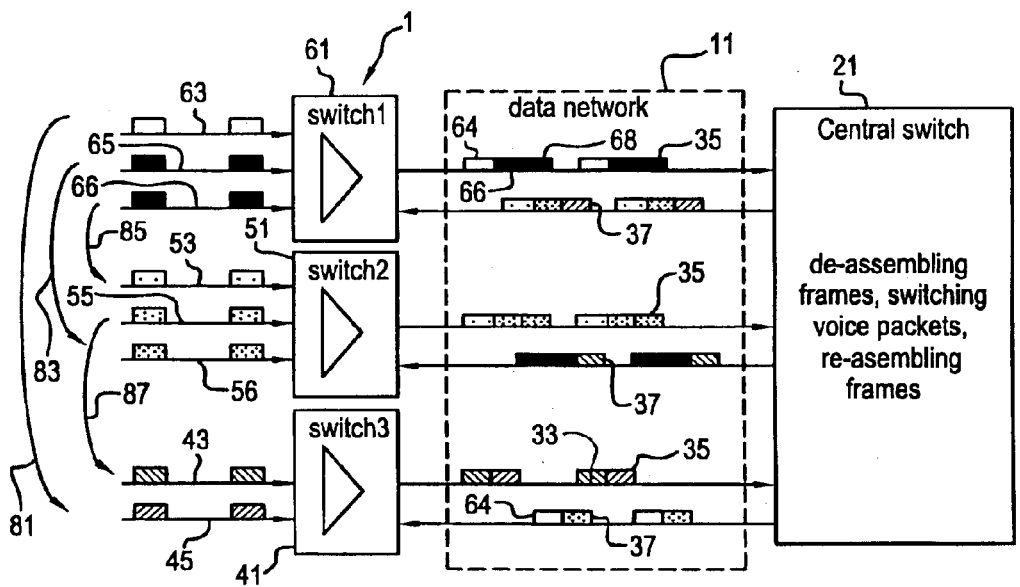
FIG. 2 is a schematic diagram of the inputs, switches, data network and central switch for switching payloads utilizing a central node that disassembles and reassembles bundled frames from different switches.

The longer frames 35, in FIG. 2, with the switch addresses are output from their respective switches 1 and sent over a connection line 20 to the data network 11.

Frame bundling is important, because the network load depends on the number of packets, not on the packet size. Frame bundling may be done only with the terminals 9 that are connected to the same local origination and destination switch 1. The efficiency of this invention depends on the number of switches 1 in the network and the amount of traffic between any pair of switches.

A second aspect of the invention, payload switching, then sets up one or more central nodes 21 that are connected to a plurality of other origination/destination switches 41, 51 and 61. Payload switching is the action of disassembling one or more long combined frames from the several local switches 1 and then reassembling them into one or more other long combined frames addressed to specific local switches. The central node 21 is able to disassemble and reassemble combined frames 35 and may be considered as a voice packet switch. The disassembled and then reassembled frames 37 are sent back to the switches 41, 51 and 61 from the central node 21. FIG. 2 illustrates the advantage of payload switching in a large network. Particular switches 1 are indicated as switches 41, 51 and 61. Many such switches 1 are connected via the data network 11 to the central node switch 21.

In FIG. 2, switch 51 has two terminals 53 and 55 that correspond to lines 3 and 5 in FIG. 1. Arrows 81, 83, 85 and 87 represent intended connections between terminals 9 such as phones 8 or computers 7 that are connected to the lines 43, 45, 53, 55, 56, 63, 65, and 66. For example, arrow 81 shows an intended connection between the terminals connected to lines 63 and 45. Packets from switch 61 as shown by intended connections 81, 83 and 85 are sent to two different switches 51 and 41.

Without payload switching, frame bundling could not be used and there would be no reduction of overhead. With payload switching, the switch 61 is always sending its voice packets 64, 66, 68 to the central node 21, which builds the frames according to the runtime switching tables. These tables are set when calls are established across the network. This mechanism is similar to the establishment of a phone call across the PSTN, except that the switched units are voice packets 33 inside data frames 35, instead of timeslots inside TDM streams.

When voice packets are combined in large frames, a small 4-byte header is added to the voice data. The 4-byte header contains the type of packet (voice, fax, silence, modem, dtmf, etc.), the length of the packet (variable packet sizes are supported), and the destination channel (for payload switching). The 4-byte header replaces the 40-byte IP header that is appended to every voice packet in the absence of frame bundling.

While the invention has been described with reference to specific embodiments, modifications and variations of the invention may be constructed without departing from the scope of the invention, which is defined in the following claims.

I claim:

1. An apparatus for sending digitized voice over a data network, comprising:
    a plurality of terminals for transmitting digitized signals, wherein the digitized signals may be compressed and uncompressed;
    a plurality of switches for receiving the digitized signals and for acting as a protocol converter/adapter for the incoming signals from the plurality of terminals;
    first lines for connecting the plurality of terminals to at least one of the plurality of switches;
    wherein each of the plurality of switches further comprises a compression module for compressing the incoming voice signals to digitized voice packets when the incoming voice signals are uncompressed and for packaging the compressed digitized data packets in a format compatible with web protocols;
    wherein each of the plurality of switches further comprises a bridging module for packaging the incoming digitized data packets into a format compatible with web protocols when the incoming packets are compressed;
    wherein each of the plurality of switches further comprises a combining/switching module within the switch for combining the formatted digitized voice packets into long frames;
    a data network for receiving the long frames from the plurality of switches;

a second line for connecting the plurality of switches to the data network; and a central switch for receiving the longer frames from the data network and for disassembling, switching and reassembling the longer frames and for returning the reassembled frames to the data network.

2. The apparatus of claim 1, wherein the first lines are selected from the group consisting of PSTN lines, PABX lines, LAN lines, Internet lines, and other lines.

3. The apparatus of claim 1, wherein the second line is selected from the group consisting of ethernet lines, V35 lines, G704 lines, and other lines.

4. The apparatus of claim 1, wherein the data network is selected from the group consisting of an Internet protocol (IP) network, a frame relay network, an X25 network, a leased line network, and other networks.

5. A method for combining incoming digitized voice packets into longer frames, comprising:

receiving incoming voice and data signals;

compressing the incoming voice signals to digitized data packets when the incoming voice signals are uncompressed;

packaging the compressed digitized voice packets into a format compatible with web protocols;

bridging the incoming data signals to digitized data packets when the incoming digitized data signals are compressed;

packaging the bridged digitized data packets into a format compatible with web protocols;

combining the formatted digitized data packets into first long frames;

transmitting the first long frames over a data network, receiving the first long frames in a central node switch;

disassembling the formatted data packets from the first long frames;

assembling the disassembled data packets into second long frames; and transmitting the second long frames to switches.

6. A method for sending digitized packets over a data network, comprising:

receiving incoming voice signals from a plurality of telephones and receiving compressed data signals from computers in a lesser plurality of switches;

compressing the incoming voice signals into digitized data packets, when the incoming voice signals are uncompressed;

packaging the compressed digitized data packets into a format compatible with network protocols;

bridging the incoming digitized data signals into digitized data packets, when the incoming digitized data signals are compressed;

packaging the bridged digitized data packets into a format compatible with network protocols;

combining the formatted digitized data packets into first long frames;

sending the first long frames from the plurality of switches to a data network;

sending the first long frames from the data network to a central switch;

disassembling the formatted data packets within the first long frames in the central switch;

reassembling the formatted data packets into second long frames in the central switch; and sending the reassembled frames from the central switch through the data network and the plurality of switches to the telephones and computers.

7. The method of claim 6, wherein the combining the formatted digitized data packets into the first long frames further comprises adding a 4-byte control information header to each of the digitized data packets prior to combining the digitized voice packets.

8. Switch apparatus for combining digitized voice signals into large frames, comprising:

a protocol converter/adapter switch for receiving the incoming digitized voice signals and for compressing the incoming voice signals into digitized voice packets from a plurality of terminals, and for adding a header with packet type and length and channel address;

a compression module for compressing the incoming digitized voice signals into voice packets when the incoming signals are uncompressed and for packaging the compressed digitized voice packets into a format compatible with web protocols;

a bridging module in the switch for packaging the incoming digitized voice signals as compressed voice packets in a format compatible with web protocols when the incoming packets are compressed and for adding a header with packet type and length and channel address; and a combining/switching module connected to the compression module and to the bridging module within the switch for combining the formatted digitized voice packets into longer frames.

9. An apparatus for sending large frames of digitized packets over a data network, comprising:

a plurality of terminals for transmitting digitized voice signals or compressed data signals;

a switch connected to the terminals for receiving the voice signals and for acting as a protocol converter/adapter for the incoming digitized voice packets from the plurality of terminals;

lines for connecting each of the plurality of terminals to the switch;

wherein the switch further comprises a compression module for compressing the incoming voice signals into digitized voice packets when the incoming voice signals are uncompressed and for packaging the compressed digitized voice packets into a format compatible with web protocols;

wherein the switch further comprises a bridging module for packaging the incoming compressed digitized data packets into a format compatible with web protocols when the incoming packets are compressed; and wherein the switch further comprises a combining/switching module within the switch for combining the formatted digitized voice and data packets into longer frames.

10. The apparatus of claim 9, wherein the lines are selected from the group consisting of PSTN lines, PABX lines, LAN lines, Internet lines, and other lines.

11. A method for combining incoming digitized voice packets into longer frames, comprising:

receiving incoming voice and data signals;

compressing the incoming voice signals to digitized data packets when the incoming voice signals are uncompressed;

packaging the compressed digitized voice packets into a format compatible with web protocols;

bridging the incoming data signals to digitized data packets when the incoming digitized data signals are compressed;

packaging the bridged digitized data packets into a format compatible with web protocols;

combining the formatted digitized data packets into first long frames; and transmitting the first long frames over a data network.

* * * * *